June 28, 1949.   S. G. YOUNT ET AL   2,474,770
BAG AND METHOD OF MAKING THE SAME
Filed May 15, 1944   5 Sheets-Sheet 1

Inventors:
STANLEY G. YOUNT and
PAUL R. HALSTEAD,
Attorney.

June 28, 1949.  S. G. YOUNT ET AL  2,474,770
BAG AND METHOD OF MAKING THE SAME
Filed May 15, 1944  5 Sheets-Sheet 2
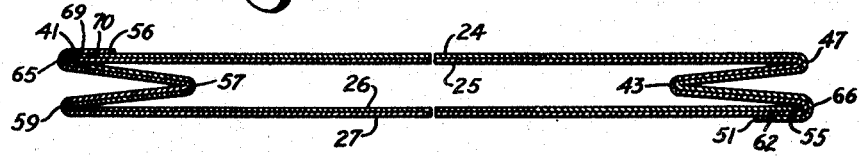
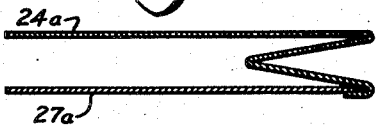
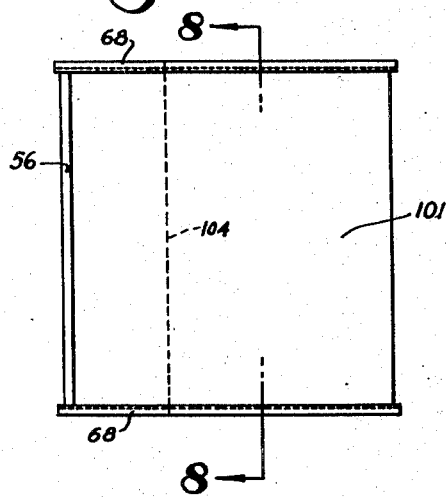
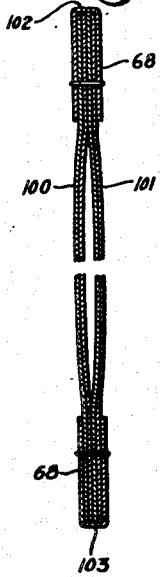
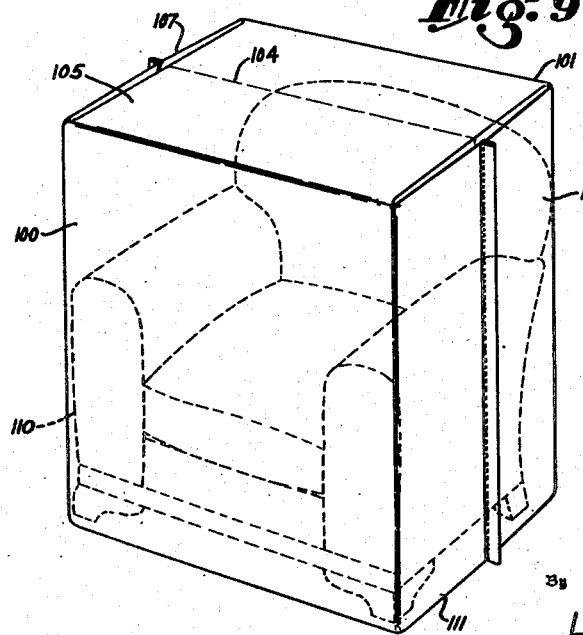
Inventors:
STANLEY G. YOUNT and
PAUL R. HALSTEAD,
Attorney.

June 28, 1949.  S. G. YOUNT ET AL  2,474,770
BAG AND METHOD OF MAKING THE SAME
Filed May 15, 1944  5 Sheets-Sheet 3
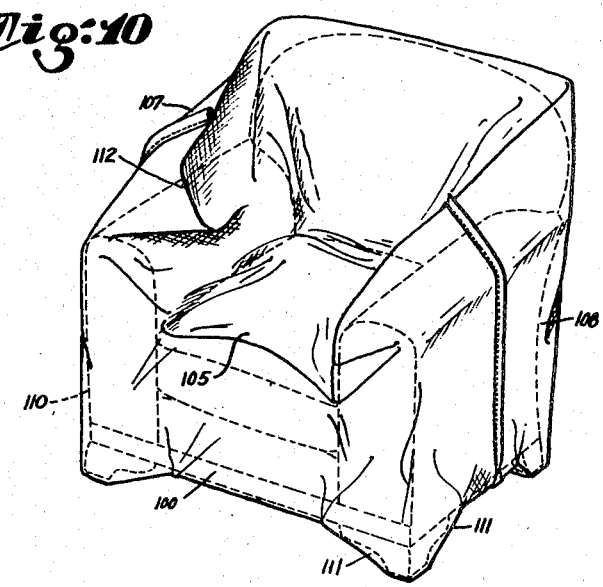
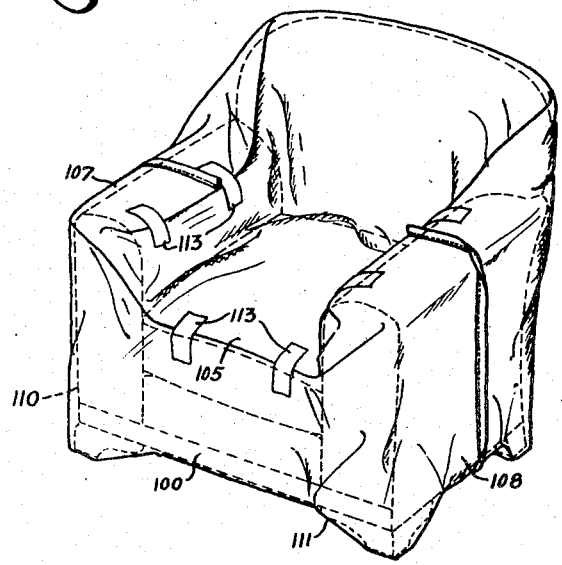
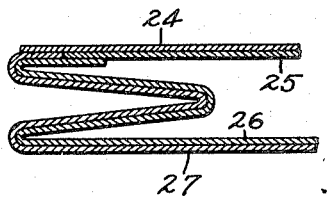
Inventors:
STANLEY G. YOUNT and
PAUL R. HALSTEAD,
By
Attorney.

June 28, 1949.　　　　S. G. YOUNT ET AL　　　　2,474,770
BAG AND METHOD OF MAKING THE SAME
Filed May 15, 1944　　　　　　　　　　　　　　5 Sheets-Sheet 4
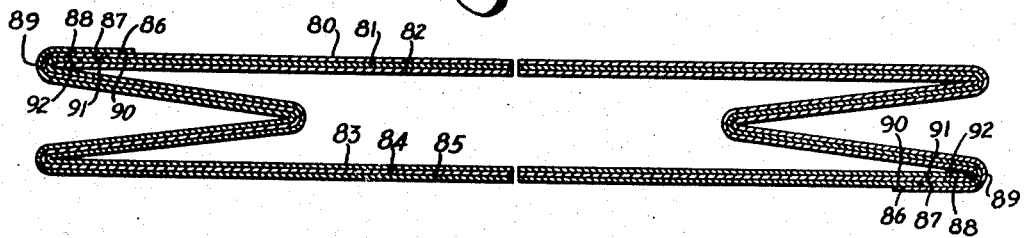
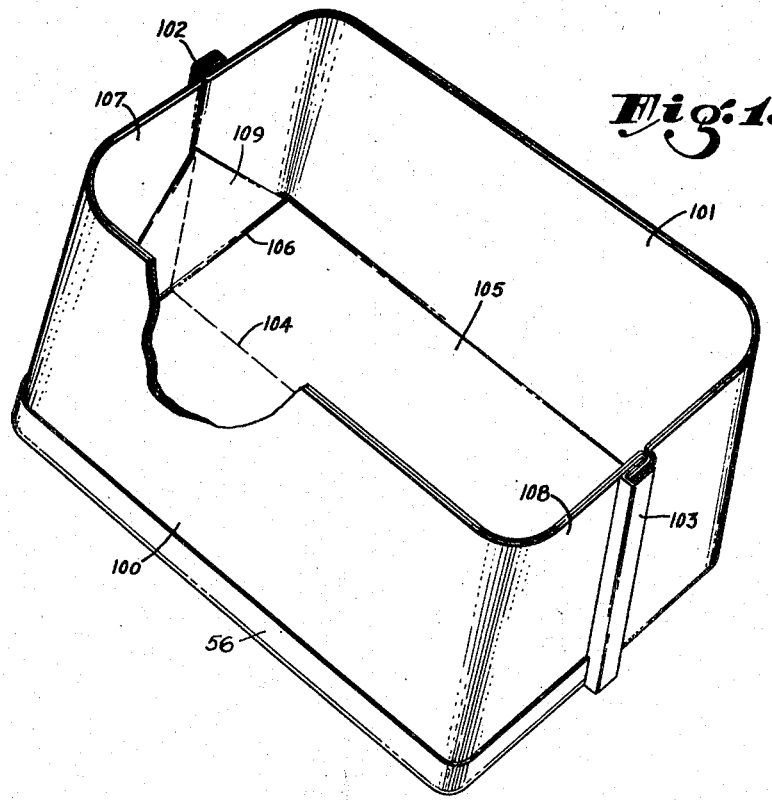
Inventors:
STANLEY G. YOUNT and
PAUL R. HALSTEAD,
Attorney.

June 28, 1949.    S. G. YOUNT ET AL    2,474,770
BAG AND METHOD OF MAKING THE SAME
Filed May 15, 1944    5 Sheets-Sheet 5
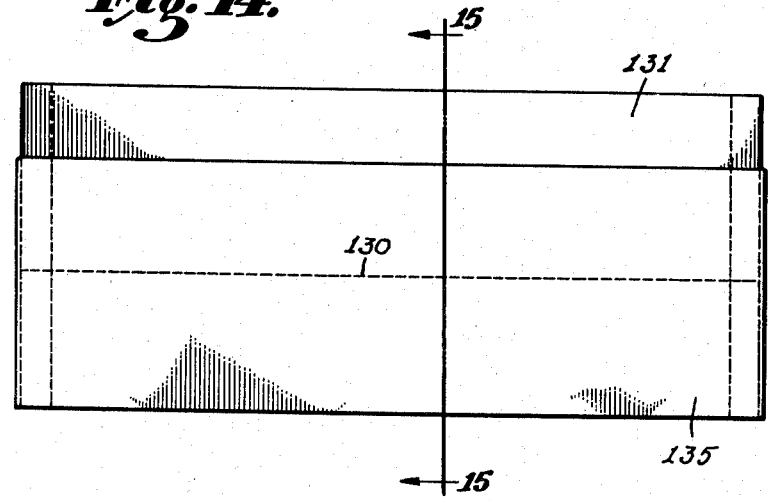
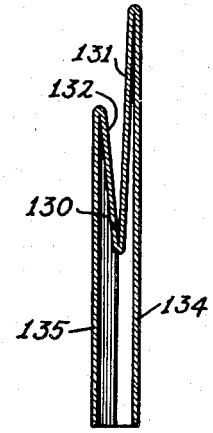
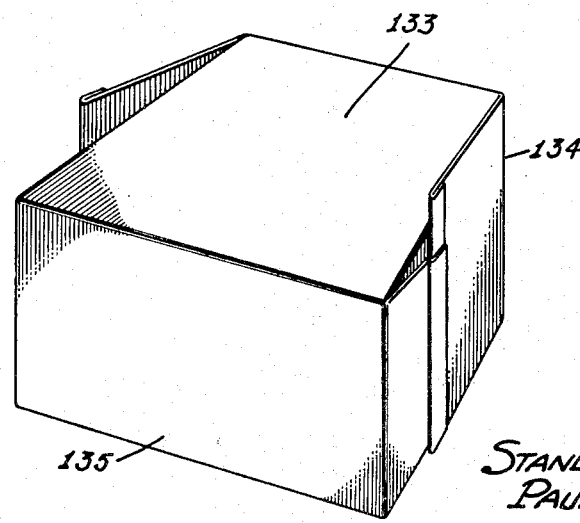
STANLEY G. YOUNT and
PAUL R. HALSTEAD,
INVENTORS.
BY
ATTORNEY.

Patented June 28, 1949

2,474,770

UNITED STATES PATENT OFFICE 2,474,770

BAG AND METHOD OF MAKING THE SAME

Stanley G. Yount, Los Angeles, and Paul R. Halstead, Compton, Calif., assignors to Southland Paper Converting Company, Los Angeles, Calif., a corporation of California Application May 15, 1944, Serial No. 535,642

7 Claims. (Cl. 229—53)

This invention relates to the art of manufacturing paper bags and is particularly adaptable to the production of large circumference, heavy bags suitable for covering items such as divans and arm-chairs, also for lining boxes, cartons, etc. The invention is also applicable to the fabrication of relatively smaller bags. It is adaptable to the fabrication of either single-walled or multi-walled bags.

A very large multi-walled gusset type bag best exemplifies the invention as there is a substantial need for such bags, particularly of a construction which can be employed in covering divans, armchairs and other similar articles of furniture for shipping and storing, bags for this purpose having been previously made by hand and embodying a different construction than that which characterizes our present invention.

The bags previously made by hand for the purpose of covering divans, chairs and the like have more or less conformed to the general outline of such articles of furniture, being inverted over the same, and are satisfactory except from the standpoint of manufacture, being necessarily made by hand and involving a relatively costly method.

We have discovered that a bag can be constructed suitable for the purpose without initially conforming to the shape of the article to be covered by making a bag with a relatively deep gusset at the bottom so that the bag can be spread open to form a substantially rectangular housing which is invertible over the divan or the like and the walls and bottom of which bag can be folded in over the arms of the divan or the like and fastened down by Scotch tape, adhesive or other means. It is important in this connection that the so-called bottom of the bag be relatively flexible, preferably that it has the same flexibility as the walls of the bag so that the proper folds may be made to generally conform to the furniture. A conventional bag construction is not suitable for the purpose because the bottoms of conventional gusset bags have several layers of paper glued together in such a manner as to result in a stiff area which cannot be suitably folded in the manner required for the purposes intended here.

The objects and purposes of our invention will become more apparent when it is considered that the jumbo roll is the largest unit of paper commercially employed for automatic or continuous processing. It has been found by experience to be the largest and heaviest paper roll unit which can be satisfactorily handled by standard equipment. Considering further that the conventional method of fabricating bags is to fold paper longitudinally as it comes from a roll which reduces either the width or depth of the bag to somewhat less than half the width of the paper depending upon the bag construction, it has never been possible to manufacture the largest bags of the character described above from a roll, for the simple reason that even the jumbo roll is not wide enough to supply a sheet adequate under known manufacturing methods.

The present application is related to the copending application of Stanley G. Yount, Serial No. 497,157, filed August 3, 1943, for Paper bag and method of making the same, in that the bag of the present application may be fabricated by employing some of the manufacturing steps disclosed in said copending application, and some of the features of the present bag are borrowed with modifications from the bag of the said copending application.

The primary object of our present invention is to provide a bag construction and method of making the same whereby bags of large circumference with a deep bottom gusset may be manufactured by a continuous mechanical process from large rolls of paper such as the jumbo roll.

Another object of our invention is to apply the principles involved in manufacturing bags according to our invention for producing a dual output of continuous forms from which the bags may be cut and the ends closed, such dual output being in the form of a continuous tube with gussets formed at opposite sides, the tube being split along the center whereby each half may be processed for completing the bag.

A still further object of the invention is to provide a bag of the character described and a method of producing it wherein the bag may be either of the single-walled or multi-walled type.

These and other objects and advantages of our invention will become apparent from a further consideration of the description and drawings.

In the drawings:

Figure 5 is a cross-sectional view of completed bag sections ready for cutting into bag lengths.

Figure 6 is a view similar to Figure 5 of a section for a single walled bag.

Figure 7 is a side elevation of a completed bag turned at 90° to harmonize with the illustration of Figure 5.

Figure 8 is an enlarged cross-sectional view taken on the line 8—8 of Figure 7.

Figure 9 is a perspective view of one of our bags opened out and inverted over a chair.

Figures 10 and 11 illustrate successive folding operations for completing the covering of the chair.

Figure 12 is a cross-sectional view of dual tube units to be completed into 3-ply bags.

Figure 13 is a perspective view of one of our bags of somewhat different proportions than those illustrated in Figure 9 opened in upright position as would be suitable for lining a box or the like.

Figure 14 is an elevation of a modified form of bag embodying our present invention characterized by a gusset the outside opposite walls of which are of different depth.

Figure 15 is a cross-sectional view of the same taken on the line 15—15 of Figure 14.

Figure 16 is a perspective view of the bag of Figures 14 and 15 opened with the bottom uppermost.

Figure 17 is a fragmentary cross section of a modified form of construction in which the stepped joint between the walls is inside instead of outside.

Figure 1:
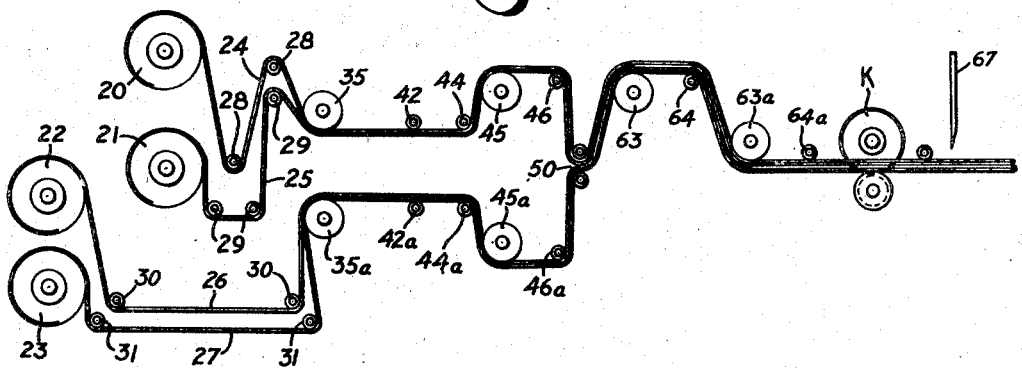
Figure 1 is a schematic view in the nature of a side elevation illustrating an apparatus suitable for carrying out, and the progressive steps involved in, the manufacture of a multi-walled gusset type bag according to our invention.

In producing a double-walled bag embodying our invention, we may employ four paper supply rolls 20, 21, 22, and 23, delivering sheets of paper 24, 25, 26, and 27. The several sheets of paper coming off of the respective rolls pass over groups of guide rollers 28, 29, 30, and 31 respectively.

Sheet 24 is superimposed on sheet 25 and they are caused to travel under a folding roll 35. The sheets are laterally offset in delivery to the folding roll so that while these sheets are of equal width the edges do not coincide but form steps. This may be accomplished by offsetting the rolls 20 and 22 from rolls 21 and 23 respectively. The edge of the upper sheet 24 extends beyond the corresponding edge of lower sheet 25 on one side leaving a marginal single thickness area 40, and on the other side the edge of the lower sheet 25 extends beyond the corresponding edge of the upper sheet 24 leaving an oppositely positioned single thickness marginal area 41.

With the sheets offset as shown and described, the folding roll 35 in conjunction with a tucking roll 42 makes a longitudinal fold 43 along one side of the double sheet paper.

Figure 3:
Figure 3 is a cross-sectional view illustrating the first folding step according to our method in the manufacture of a double-walled bottom gusset type paper bag made by our dual production method.
Figure 4:
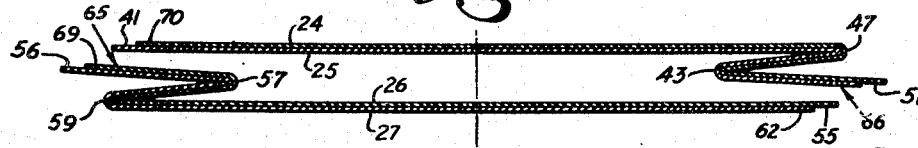
Figure 4 is a similar view illustrating the second folding step.

The folded sheets then pass under a directional roller 44 and over a second folding roll 45 which in conjunction with a tucking roll 46 makes a longitudinal fold 47 along an imaginary line indicated at 48 in Figure 3. The completed fold is shown in Figure 4, roughly resembling the letter Z.

At a gluing station 50 adhesive is applied to the marginal area 41 and also longitudinally along the marginal surface 70 of the sheet 24.

While the sheets 24 and 25 are being processed as described, sheets 26 and 27 are simultaneously and similarly handled by folding and tucking rolls and a gluing station similar to those previously described, for the purpose of preparing the lower sheets 26 and 27 similarly but in reverse position to the preparation of sheets 24 and 25.

The lower sheets 26 and 27 are offset so that the upper sheet 26 affords a marginal single thickness area 55 on the side corresponding to the fold in the upper pair of sheets 24 and 25; and at the opposite side, the sheet 27 affords a marginal area 56 of single thickness. The double sheets are folded at 57 in the first stage by folding roll 35a and tucking roll 42a, and folded back along a line 58 to form a fold 59 in the second stage by folding roll 45a and tucking roll 46a. In the gluing station 50 adhesive is applied to the steps comprising area 55 and a longitudinal marginal area indicated generally by the numeral 62.

It is noted that the upper pair of sheets and the lower pair of sheets are offset and folded identically, except that they are inverted with the folded sides reversed.

Instead of gluing the marginal areas indicated, adhesive may be applied to the folded edges 40 and 56 and longitudinally along their respective adjacent companion sheets. It is possible by either method of applying adhesive to either smear the adhesive so that both tubes will be more or less glued together along the seams, or the application of the adhesive may be so regulated that the outer tube will be unattached to the inner tube in the completed nested tubes, or bags.

The two pairs of processed sheets are brought together at the gluing station, and after the adhesive is applied, pass over a folding roll 63 and a tucking roll 64 whose combined function is to fold the lower pair of sheets along a line 65 over the marginal edges (or steps) of the upper pair of sheets and compress them to cause the adhesive to stick. This completes the seams along one side. A similar closing in inverted position is made along a fold line 66 at the opposite side by a folding roll 63a and tucking roll 64a.

The nested tubes are formed in a continuous operation, and may be slit along the center by a circular knife K, and may be cut into bag widths by a knife 67, and the ends of each bag may be closed by a reinforcing tape 68 stitched as illustrated in Figures 7 to 11.

The apparatus diagrammatically illustrated and referred to in explaining the method constitutes merely one form of apparatus assembled from conventional elements for performing the several steps in the order and in the manner described. Folding rolls and tucking rolls are well known in the art and gluing stations as well as knives are also well known. Any other form of device suitable for performing the required steps may be employed. The bag may be made by hand, but will not ordinarily be thus fabricated, as one of the advantages of our method is its adaptability to continuous machine manufacture of bags.

Figure 2:
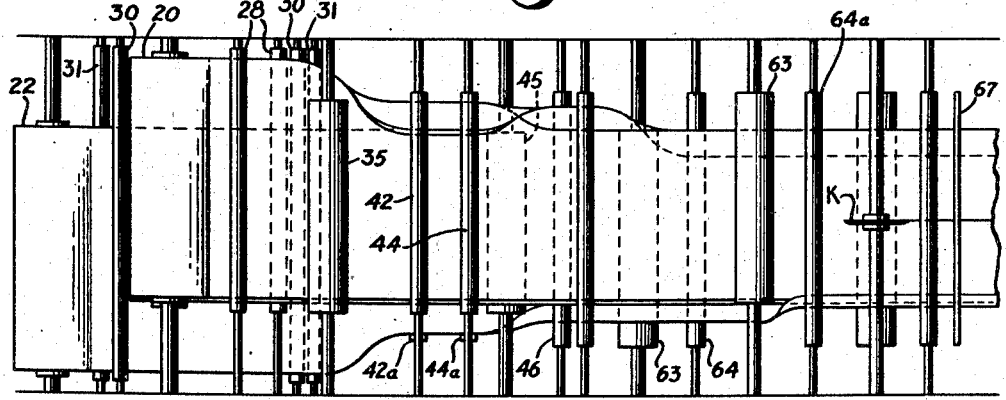
Figure 2 is a schematic top plan view of the same.

Instead of forming a tube and slitting it for a dual manufacturing operation, we may form the gusset and close the seam along one edge only leaving the opposite edge open. In such case folding operations along one side only of the apparatus illustrated in Figures 1 and 2 would be employed, and the several sheets of paper would preferably be of the required initial width so that they could be offset in the manner described along the edges where the folding and closing occur but would all register along the open edge.

The finished bag as illustrated for example in Figures 7 and 8 comprises nested pockets, the inner pocket being fabricated of sheets 25 and 26, and the outer pocket comprising sheets 24 and 27, the two pockets being optionally adhered to each other along the seams or left unattached, depending upon the provision in applying the glue or adhesive. The marginal step surface 69 of sheet 26 lies against the area or step 41 of sheet 25 and the edge of sheet 24 abuts against the edge of sheet 26. The marginal step area 56 of sheet 27 overlies the marginal surface 70 of sheet 24. Similar relationship in inverted position occurs on the opposite half, complementary areas or steps 51 and 55 contacting, and 40 and 62 contacting. The edge of sheet 25 abuts the edge of sheet 27. Gussets are formed in one bag between the folds 65, 57, and 59 and in the other bag between folds 47, 43, and 66.

Reducing the method to a simpler operation for fabricating a single walled bag, as in Figure 6, the folding operation may be the same except that there is a single upper sheet 24a and a single lower sheet 27a which are simultaneously folded in the manner previously described, and the overlapping edges at diametrially opposite corners when viewing the tube in cross section, are glued or cemented and the tube is similarly slit longitudinally to provide dual bag forming sections.

In Figure 12 we illustrate a section of triple-walled gusset type bags in which three upper sheets 80, 81, and 82 and three lower sheets 83, 84, and 85 are employed, resulting in three nested tubes located one within another, either independent or adhered together as may be desired. In this case the upper sheets are offset to provide three stepped marginal attaching areas 86, 87, and 88, and the lower sheets are offset so that in the final fold over 89 complementary step contact surfaces 90, 91, and 92 match with the areas 86, 87, and 88. The same arrangement may be employed in manufacturing a multiple walled bag with any desired number of thicknesses.

The important thing is that, regardless of how fabricated, we provide a bag, either single or multiple ply, comprising opposite side walls 100 and 101 closed at the ends 102 and 103, and formed with a relatively deep gusset 104 in the bottom only of the bag. By eliminating gussets in the ends or sides we reduce the manufacturing operations to a minimum, and obtain a bag which has exceptional utility for the purposes mentioned.

In use, as for example, covering chairs or divans, the bag is opened out (as seen in Figure 13, the bag there illustrated being suitably proportioned for a divan, while the bag in Figure 9 is proportioned for a chair). In opening out the bag, the gusset 104 is flattened out so that a substantially rectangular bottom 105 is formed. This is accomplished by spreading the sides 100 and 101 and pushing out the gusset, whereupon end folds 106 will be formed, defining end corners of the bottom, and portions of the sides 100 and 101 will be thus brought around to establish end walls 107 and 108. The ends of the gussets above the folds 106 are flattened out into triangular panels 109 against the end walls 107 and 108.

In this condition, as previously mentioned, the bag may be used as a box or carton lining, or for various other purposes.

For a divan or chair covering, the bag is inverted over the article, as shown in Figure 9, with the end walls 107 and 108 against the sides of the chair (indicated by dotted lines 110). The bottom 105 and forwardly located side walls are pushed down and in against the seat and back of the chair, as seen in Figure 10. At this time, or later, the free edges 111 of the bag may be tucked under the body of the chair between the legs. Somewhat loose folds 112 occur above the arms of the chair when the bottom and wall are pushed into the chair, as described, and these should be smoothed down as shown in Figure 11. Gummed tape or other adhesive material 113 may be applied, where necessary, to hold the folds in place, so that the completed covering conforms to the outline of the chair, effectively protecting the chair for storage or shipment, and reducing the bulk of the package to substantially the size and shape of the chair plus the thickness of the walls of the bag.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent products and methods.

Thus, if sheets of sufficient size are available, the bag may be formed without overlapping joints by merely preparing a pocket with the gusset in it from a single sheet (superimposing two or more sheets if a multiple-walled bag is desired), and closing the pocket at the ends. In all forms, the ends of the gusset folds are caught in the end closing means. The marginal overlap 56 of Figure 7 appears also in Figure 13, but is intentionally omitted in Figures 9 to 11 for two reasons: First, to illustrate this overlap in those figures would be confusing. Second, as the bag may be made optionally without this overlap, as described in the first part of this paragraph, Figures 9 to 11 may be interpreted as illustrations of such a modified bag construction.

Another variation which may be employed in a multi-walled bag is to laminate the sheets throughout their entire area whether made by the overlap method or the method described in the preceding paragraph, using any suitable adhesive or laminating material for adhering the sheets together.

A still further variation may involve, in a single walled bag as shown in Figure 6, a reversal in relationship of the point between the sheets 24a and 27a, whereby the sheet 27a lies outside of the turned back edge of the sheet 24a. A similar reversal can be employed in the multi-walled bag shown in Figure 5, or in any other adaptation of nested tubes, either attached or non-attached, of the general nature of the tubes (shown slit in Figure 5), by offsetting the sheets in the opposite manner from that illustrated, and causing the stepped joints between walls 24—25 and 26—27 to lie on the inside instead of the outside of sheets 24—25, as illustrated in Figure 17.

The modification shown in Figures 14 to 16 is characterized by the gusset 130 having one fold 131 which is deeper than the opposite fold 132. Otherwise, the bag of these figures may embody the structural features of any of the other forms shown or described. When this bag is opened out, as shown in Figure 16, the bottom 133 contributed by the gussets 130 slopes in the manner shown from a deep side wall 134 to a more shallow side wall 135, thus more nearly conforming initially to an article of furniture such as a chair or divan.

Having described our invention, what we claim as new and desire to secure by Letters Patent is:

1. A paper bag comprising when collapsed side walls lying in parallel planes, a bottom having a gusset fold parallel to said side walls and substantially co-extensive in width with the latter, a sealed junction between said side walls parallel to the line of the gusset fold, the ends of said side walls being closed with the ends of said gusset folds included in the closing and said ends of the side walls having no gussets therein, said bag being adapted to open into a receptacle of substantially rectangular cross section with parallel side walls and parallel end walls, the latter being formed from end portions of the side walls.

2. A paper bag comprising when collapsed separate side walls lying in parallel planes, a bottom having a gusset fold parallel to said side walls and substantially co-extensive in width with the latter, a sealed junction between said separate side walls extending longitudinally along one side edge of the gusset fold, the ends of said side walls being closed with the ends of said gusset folds included in the closing and said ends of the side walls having no gussets therein, said bag being adapted to open into a receptacle of substantially rectangular cross section with parallel side walls and parallel end walls, the latter being formed from end portions of the side walls, and with the end portions of said gusset folds forming triangular sections overlapping the base region of said end walls.

3. A bag of the character described in claim 1 in which the walls and bottom are formed of at least two plies of paper.

4. A bag of the character described in claim 1 in which one side wall is formed of an unfolded flat sheet, and the other side wall and gusset are formed of a second sheet with the gusset fold therein and a marginal edge extending from the gusset fold overlapping and secured to the adjacent marginal edge of the first sheet to form said sealed junction.

5. A bag of the character described in claim 1 in which one side wall is formed of at least two plies of unfolded flat sheets with the bottom edges stepped, and the other side wall and gusset are formed of the same number of separate sheets as the first wall, said gusset fold being formed in one of said walls and stepped marginal edges extending from the gusset fold overlapping and secured to the complementary adjacent marginal stepped edges of the first wall.

6. Packaging means for articles of furniture such as chairs and the like comprising a bag of the character described in claim 1 inverted over such piece of furniture, the bottom and one side wall of said bag pushed in against the back and seat of such furniture, and the loose folds thus forming over the sides of said furniture being smoothed down inwardly so that the package conforms substantially to the size and shape of the furniture.

7. A bag of paper-like material incorporating side wall structure comprising separate elements of equal width having top and bottom edges and a bottom comprising when in collapsed condition a gusset fold, a connection intermediate opposite side elements comprising overlapped portions of said paper-like material fastened together in a line parallel to the edges, and separate means securing together adjacent edges of the side elements on respective sides of the bag and including adajcent portions of said gusset fold.

STANLEY G. YOUNT.
PAUL R. HALSTEAD.

REFERENCES CITED

The following references are of record in the file of this patent:

UNITED STATES PATENTS

| Number | Name | Date |
|---|---|---|
| 155,610 | Grinter | Oct. 6, 1874 |
| 258,925 | Holmes | June 6, 1882 |
| 1,238,411 | Leary | Aug. 28, 1917 |
| 1,475,008 | Fluellen | Nov. 20, 1923 |
| 1,549,832 | Hartmann | Aug. 18, 1925 |
| 1,821,246 | Taylor | Sept. 1, 1931 |
| 1,900,953 | Rosen | Mar. 14, 1933 |
| 2,200,989 | Royal | May 14, 1935 |
| 2,294,364 | Currier | Sept. 1, 1942 |
| 2,316,385 | Abramson | Apr. 13, 1943 |